United States Patent [19]
Sawyer, Jr.

[11] Patent Number: 5,566,456
[45] Date of Patent: Oct. 22, 1996

[54] PRECISION CUT SAW GUIDE BASE PLATE

[76] Inventor: Thomas K. Sawyer, Jr., 308 Oyster La., Virginia Beach, Va. 23456

[21] Appl. No.: 403,401

[22] Filed: Mar. 14, 1995

[51] Int. Cl.⁶ .............................. B23D 47/02; B27B 9/04
[52] U.S. Cl. ................................. 30/374; 83/574
[58] Field of Search .......................... 30/371, 372, 373, 30/374, 375, 376; 83/574, 743, 745

[56] References Cited

U.S. PATENT DOCUMENTS

| | | | |
|---|---|---|---|
| 2,306,512 | 12/1942 | Whitney | 83/574 |
| 2,802,493 | 8/1957 | Horneland | 83/574 |
| 2,899,989 | 8/1959 | Sells | 83/574 X |
| 3,481,374 | 12/1969 | Schindler | 30/373 |
| 4,453,312 | 6/1984 | Nishioka | 30/372 |
| 4,602,435 | 7/1986 | Nishioka | 30/372 |
| 4,777,726 | 10/1988 | Flowers | 30/374 |

OTHER PUBLICATIONS

"Constant–force Springs" brochure; p. 64; publisher and publication date unknown.

*Primary Examiner*—Rinaldi I. Rada
*Assistant Examiner*—Raymond D. Woods

[57] ABSTRACT

A precision cut saw guide base plate apparatus to be used on a portable hand held power circular saw for aiding in cross cutting a workpiece. A sliding system attached to the base plate of the saw includes a fence which is pivotably from a stored position on the upper saw side of the base plate to an operative position on the lower workpiece side of the base plate. The fence engages the workpiece during cross cutting and the base plate slides relative to the sliding system against the bias of a nearly constant force extension spring. A rubber shock bumper between the base plate and the sliding system absorbs shock when the spring returns the sliding system and the base plate to a retracted position.

6 Claims, 2 Drawing Sheets

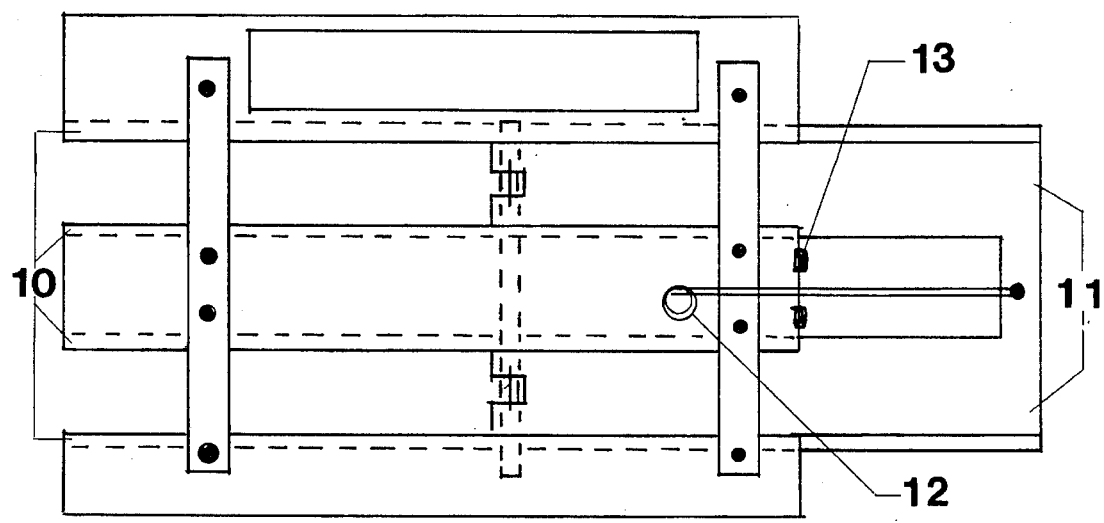
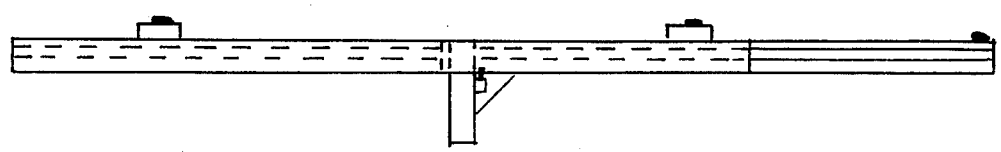
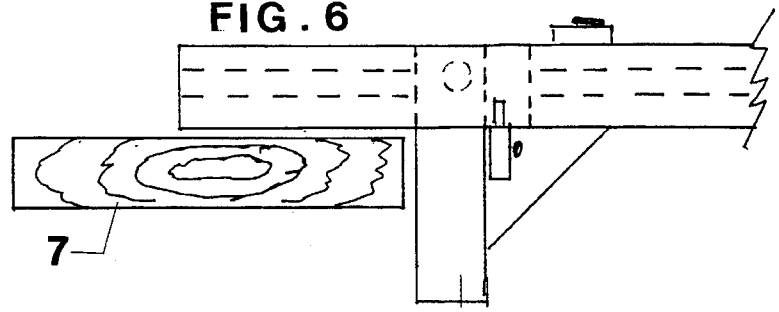

PRECISION CUT SAW GUIDE BASE PLATE

BACKGROUND OF THE INVENTION

1. Field of the Invention

This invention relates to a portable circular hand held power saw base plate. This base plate has the capability of engaging a system to preform a precision perpendicular cut to the longitudinal axis of the material being cut.

This base plate is not an add on saw guide to a hand help circular power saw, but rather, a new type of base plate that can be manufactured with the saw or as a retro—fit precision saw base replacement for existing circular saws. This base plate can be used like any presently manufactured circular saw base plate but has the capability of engaging the precision cut mechanism.

2. Description of the Prior Art

A review of the art in the field reveals a number of devices designed to guide a circular saw blade perpendicularly across a longitudinal axis. Examples include:

U.S. Pat. No. 4,777,726 issued to randy flowers which describes a guide for portable hand help power circular saws. The primary drawbacks to this invention are the limitation on the width of the material being cut when the guide is in the operating position. From the vertical center axis of the saw blade to the stop positions of the saw guide there is a very limited space for cutting the desired product. Also the coil springs used for resistance to the forward movement of the saw itself, and for the return of the slide plate, are a poor choice of springs as this type of spring offers varying degrees of resistance and a varying degree of force for the slide plate return.

U.S. Pat. No. 4,602,435 issued to Jim Z. Nishioka which describes an aligning mechanism for power hand saws. The primary drawbacks to this invention are the use of a coil spring, which once again, offers varying degrees of resistance and a varying degree of force for the aligning device return, also the aligning device is to the far left of the main force of the forward movement of the saw, thus, this is awkward to hold without getting a pivotal action against the aligning device, which would mis-align a true perpendicular cut.

U.S. Pat. No. 5,279,037 issued to Alfred R. Leatherman which describes a guide for a portable sae. This invention is limited to sheet material and longitudinal cuts as the trailing pin described would not engage normal widths of material before they are already cut.

U.S. Pat. No. 4,619,170 issued to Peter Maier which describes a guide for a hand power tool. The primary draeback for this device id than it requires the clamping of an external guide strip to the work to be cut and an attachment affixed to the saw base to be guided along the strip.

A review of the prior art reveals that the previous inventions are very limited in use and scope. That is, they are limited in the width of the product to be cut, or not refined in design by the type of springs used or require clamping an external guide on the work to be cut.

SUMMARY OF THE INVENTION

This invention has evolved as a result of the disadvantages described in the prior art, and the need for a practical device that is easy to use.

It is almost impossible to make a perfect perpendicular cut across a workpiece by free hand. Many times it is necessary to have that precise a cut. To compensate, many craftsmen will lay a framing square across the workpiece to use the edge as a guide to run the saw against to achieve a perfect cut.

Also, it is not practical to have to clamp something to the workpiece to be cut or to clamp something to the saw to facilitate a perfect cut.

This invention overcomes both of these problems. This precision cut saw guide base plate is already part of the saw. It has two modes of operation. One mode is when the base is in a normal free hand position, and the other mode is when the base is in the saw guide position. This is accomplished with just the flick of the front fence. This device is that easy to use.

BRIEF DESCRIPTION OF THE DRAWING

FIG. 4 is a top view of the base plate in teh operative position.

FIG. 5 is a side view of the base plate in the operative position.

FIG. 6 is an expanded side view of the front fence and latch assembly as it engages a workpiece to be cut.

DESCRIPTION OF THE PREFERRED EMBODIMENTS

With particular reference to the drawings the present disclosure includes a "precision cut saw guide base plate" as it would be affixed to a portable hand held power circular saw.

Figure 1:
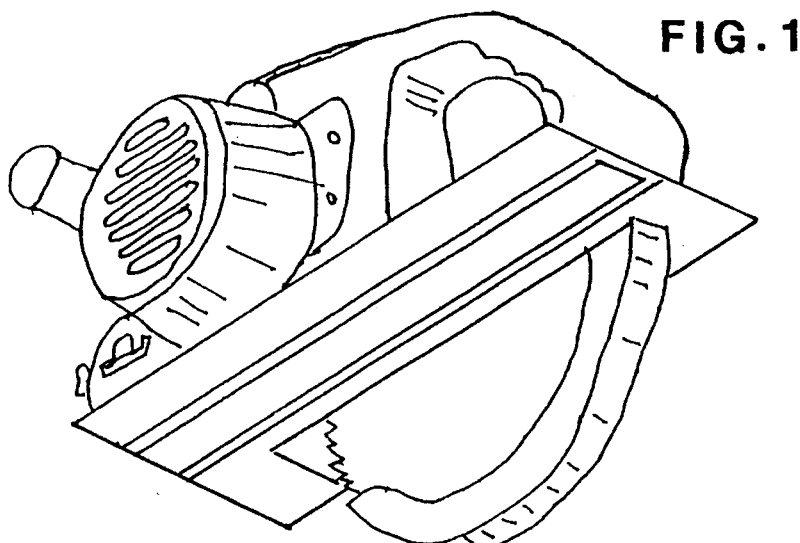
FIG. 1 is a perspective view showing the precision cut saw guide base plate attached to a portable hand held power circular saw.
Figure 2:
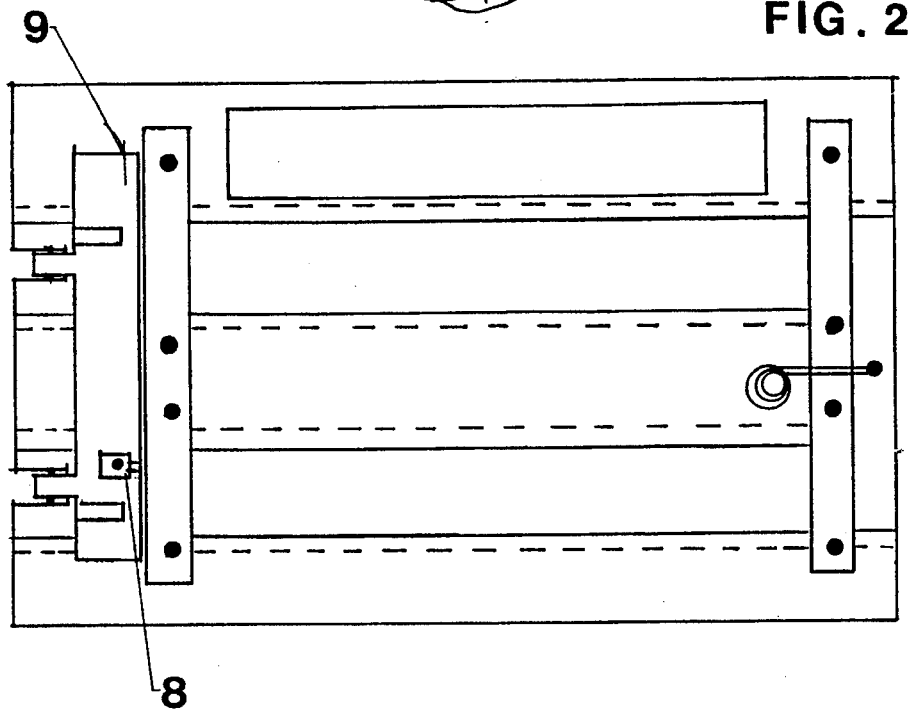
FIG. 2 is a top view of the base plate in the non-operative position.
Figure 3:
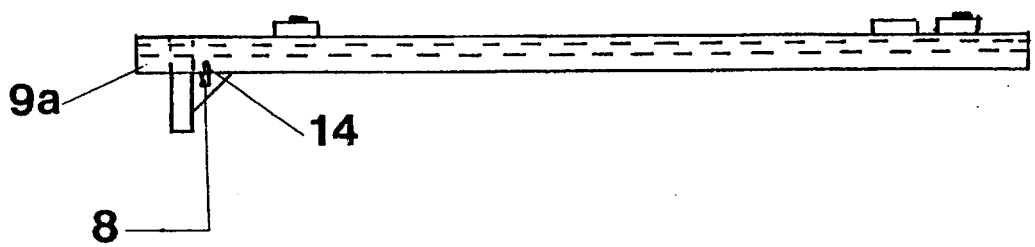
FIG. 3 is a side view of the base plate in the non-operative position.

FIG. 1 shows the "precision cut saw guide base plate" affixed to a hand held power circular saw. This is the normal position of the precision saw guide base plate when it is in the non-operative position. That is, when free hand sawing is called for.

To place the precision cut saw guide base plate into the operative mode, you simply have to release latch 8 which keeps the fence 9 in the stored position. The fence is then pivoted approtimatiley 2700 to the underside of the base plate 9a where the latch 8 is engaged into a recess latch hole 14 to maintain the fence 9b in a position that is perpendicular to the workpiece to be cut. The fence 9b is positioned on the base plate where the forward force of the saw will not cause the saw to pivot and thus hold a true straight cut.

To cut the workpiece 7 at a perfect 90° angle the base plate 9a is placed on the top of the workpiece and is moved slightly forward until the fence 9b becomes flat against the workpiece to be cut as the saw blade is aligned up to the mark made where the cut is desired.

With a forward pushing motion against the workpiece and with the saw base on top of the workpiece to be cut, the sliding bar system 11 begins a motion to the rear along the grooves 10 of the base plate 9a as the base plate 9a that is attached to the saw begins a forward movement. The spring 12 is a type of extension spring known as a "constant force spring". The constant force spring 12 offers resistance to the forward motion in order to keep the fence 9b in proper position against the workpiece to be cut. As the cut continues across the workpiece to be cut, the sliding bar system 11 which is located in grooves 10 made into the base plate moves further to the rear.

The constant force spring 12 which is attached to the fixed base 9a and the sliding bar system 11 holds the fence 9b against the product with a constant force. At the conclusion of the cut the saw is raised in a normal fashion and the constant force spring 12 returns the sliding bar system 11 to its ready position instantly for the next cut.

The rubber shock bumper 13 absorbs the impact of the sliding bar system 11 as it returns to its ready position on the base plate 9a by the constant force spring.

To return the base plate 9a to the non-operative or free style position, simply release the latch 8 and pivot the fence 9b to the top side of the base plate 9a and engage the latch 8 to hold the fence in place.

The base plate 9a can be manufactured in varying lengths to accommodate cutting varying widths of products. However the standard base plate will be of a size that will readily cut a product that is 10 (ten) inches in width.

I claim:

1. A precision cut saw guide base plate replacement apparatus to be used on a portable hand held power circular saw for aiding in cross cutting a workpiece comprising:

an elongated base plate, said base plate having an upper side including an upper surface and an opposite lower side including a lower surface, said base plate including means for attaching said power saw to said upper surface such that said elongated base plate extends in substantially the same direction as a cutting motion of the power saw, said lower surface for engagement with an upper surface of the workpiece, a sliding system attached to said base plate for longitudinal sliding movement relative to said base plate between a retracted ready position and an extended position, a spring means for biasing said sliding system and said base plate toward said retracted ready position, said sliding system including an elongated fence for engaging a side of the workpiece during said cross cutting, said elongated fence extending transversely to said elongated base plate, said fence pivotally attached to said sliding system and pivotably between a non-operative stored position on said upper side of said base plate and an operative position on said lower side of said base plate, whereby said base plate replacement apparatus and said power circular saw are used for free sawing when said fence is in said non-operative stored position, and said base plate replacement apparatus and said power circular saw are used for precision cross cutting when said fence is in said operative position.

2. The precision cut saw guide base plate replacement apparatus of claim 1 further comprising, latch means for securing said fence to said base plate when said fence is in said non-operative position and for securing said fence to said base plate when said fence is in said operative position.

3. The precision cut saw guide base plate replacement apparatus of claim 1 wherein said fence is pivotably approximately 2700 between said non-operative position and said operative position.

4. The precision cut saw guide base plate replacement apparatus of claim 1 wherein said spring means is a nearly constant force spring.

5. The precision cut saw guide base plate replacement apparatus of claim 1 further comprising, a rubber shock bumper means between said base plate and said sliding system for absorbing shock when said spring means returns said sliding system and said base plate to said retracted position.

6. The precision cut saw guide base plate replacement apparatus of claim 1 wherein said sliding system is attached to said base plate by means including grooves.

* * * * *